Feb. 9, 1943.                T. ZINTSMASTER                2,310,486
                            RESILIENT CAR WHEEL
                            Filed July 11, 1940
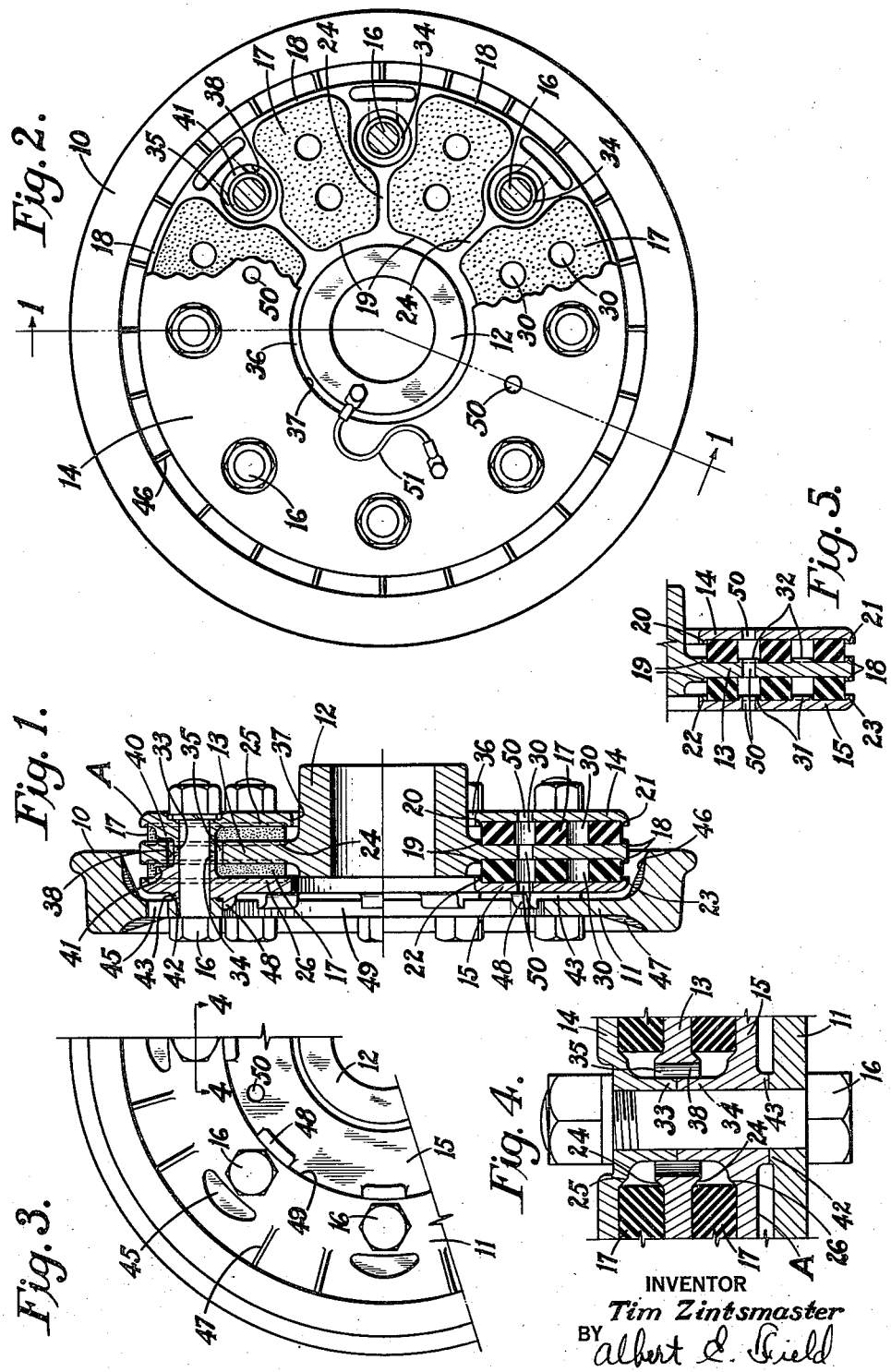
INVENTOR
Tim Zintsmaster
BY Albert E. Field
ATTORNEY Patented Feb. 9, 1943

2,310,486

UNITED STATES PATENT OFFICE 2,310,486

RESILIENT CAR WHEEL

Tim Zintsmaster, Cleveland Heights, Ohio, assignor to National Malleable and Steel Castings Company, Cleveland, Ohio, a corporation of Ohio Application July 11, 1940, Serial No. 344,925

5 Claims. (Cl. 295—11)

This invention relates to railway car wheels and more particularly to car wheels of the resilient type.

In resilient wheels used in railway service, rubber is generally employed as the cushioning medium. With the use of rubber in this type of wheel there arose the problem of preventing any destructive heating of the rubber resulting from the friction generated between the brake shoes and the tread of the wheel during application of the car brakes. It is well known that rubber deteriorates upon being heated, and therefore when there is no provision for protecting the rubber from destruction by heat, the useful life thereof as a cushioning medium in a wheel in service is comparatively short. Accordingly, it is the main object of my invention to provide a resilient wheel in which the rubber cushioning means is protected from the heat generated in the rim of the wheel during brake application.

A more specific object is to provide a wheel having the rubber cushioning means housed within a portion of the wheel separate from the rim portion.

A further object is to provide a resilient wheel in which there is a minimum of metal-to-metal contact between that portion of the wheel which houses the rubber means and the rim plate. A still further object is to provide a resilient wheel in which the rim portion is so formed as to create a circulation of air adjacent the wheel as well as to afford a large amount of surface to radiate heat therefrom.

An additional object is to provide a wheel wherein the rim may be easily removed from that portion containing the rubber means without disturbing the latter.

Other objects and advantages of my invention will be apparent from the following description taken in conjunction with the drawing, in which:

Fig. 1 is a sectional view of a wheel embodying my invention, taken on line 1—1 of Fig. 2.

Fig. 2 is a plan view partly broken away to show the rubber elements.

Fig. 3 is a plan view of a portion of the wheel, taken on the side opposite from that shown in Fig. 2.

Fig. 4 is an enlarged sectional view taken along line 4—4 of Fig. 3; and

Fig. 5 is a fragmentary sectional view showing a modified construction.

Referring to the drawing, there is shown a wheel comprising a rim portion 10 having an annular web or plate 11 and a hub 12 having an annular flange or plate 13. The hub is resiliently mounted with respect to the rim within unit A which comprises an inner plate 14 and an outer plate 15. Unit A is secured to the rim plate by means of assembly bolts 16, thus in effect forming an integral yet detachable extension of the rim. The resilient mounting of the hub within unit A is accomplished by means of the equally spaced rubber elements 17 which are interposed between the hub plate 13 and the inner and outer plates 14 and 15, respectively, and are adapted to receive both shearing and compressive stresses. The rubber elements are positioned radially within the wheel by beveled ribs 18 and beveled walls 19 on the hub plate, by beveled ribs 20 and 21 on plate 14, and by similar ribs 22 and 23 on plate 15. The elements are positioned in a circumferential direction by beveled ribs 24 on the hub plate and beveled ribs 25 and 26 on plates 14 and 15, respectively. It is to be noted that these ribs and walls are beveled starting at the surface of the plates so that when the wheel is assembled there is substantially no engagement between the sides of the rubber and said ribs and walls. The chief purpose of the ribs and walls is merely to position the rubber elements during assembly of the wheel. It is not necessary or desirable that they contact the rubber, because if such engagement take place, chafing of the rubber will result upon relative movement between the hub and the rim. Furthermore, the ribs are not needed to prevent any sliding of the elements, since in the assembled wheel the rubber is under compression and is thereby held tightly in place by the friction between the rubber and the plates. Each element is perforated, as at 30, 30, so that upon compression of the rubber the stress in the central portion thereof is materially reduced. Although the configuration of the elements is such that in conjunction with perforations 30 the rubber is precluded from being subjected to any harmful compressive stresses, it is to be understood that various other configurations may be used to attain this desired result.

If desired, the rubber elements may be positioned within the wheel solely by means of studs extending into perforations 30. Thus plate 15 may be provided with studs 31 which will position one row of elements while studs 32 on the hub plate will position the elements in the second row.

The inner and outer plates of unit A are spaced by means of bosses 33 on the inner plate and bosses 34 on the outer plate. These bosses as well as the plates are apertured to receive the assembly bolts 16. The length of the bosses is dependent upon the width of the rubber elements and upon the amount it is desired to compress the rubber during assembly. The bosses extend into openings 35 in the hub plate, said openings being of such size as to permit the desired amount of relative translational movement between the hub and the rim. In addition, the opening 36 in plate 14 may be of such size that hub 12 will engage the surface 37 of said opening at the same time bosses 33 and 34 engage surface 38 of openings 35. Relative rotational movement between the hub and rim is also limited by bosses 33 and 34 and surface 38 of openings 35.

It is thus clear that relative movement is limited in all directions in a vertical plane. Adjacent each of bosses 33 and 34 the plates are provided with pads 40 and 41, respectively, adapted to engage the hub plate and thereby limit movement thereof in an axial direction.

In order that the amount of heat transmitted to the rubber elements may be materially reduced, rim plate 11 is provided with bosses 42 which are adapted to engage pads 43 on plate 15. These bosses are of comparatively small cross-sectional area, thus providing a minimum amount of surface through which heat may be transmitted to unit A. It will also be seen that bosses 42 and pads 43 space the rim plate from plate 15, providing passages into which air may circulate to cool the plates. Openings 45 are provided in the rim plate adjacent bolts 16 to permit flow of air through the wheel and to provide more surface for radiation of heat. In addition, fan elements 46 and 47 are provided adjacent the rim to produce a circulation of air and increase the amount of heat-radiating surface. It is to be noted that air may circulate radially outwardly of the wheel through the passages between the rubber elements. Furthermore, it will be seen that there is an air space around each of the rubber elements, thereby permitting greater cooling of the rubber.

Plate 15 is provided with laterally extending lugs 48 adjacent pads 43 which engage the end surface 49 of the rim plate to assist bolts 16 in carrying the axle load and the shocks from the rim. However, in order to further decrease the contact surface between the rim plate and plate 15, these lugs may be omitted and the entire load carried by the bolts.

To facilitate assembly and disassembly of the wheel, positioning pin holes 50 are provided through the inner and outer plates and the hub plate in line with openings 30 in the rubber elements. Where the plates are provided with studs 31 and 32, as shown in Fig. 5, the holes 50 also pass through the studs. The wheel is preferably assembled with the parts in horizontal position. After outer plate 15 has been positioned on the rim plate 11, close fitting pins of suitable lengths are placed through openings 50. The rubber elements are then positioned on plate 15 and the hub 12 added with the pins passing through openings 50 in the hub plate. In like manner, after the second row of rubber elements has been added, inner plate 14 is placed in its correct position. Thereafter the assembly may be completed by securing the parts with bolts 16 and removing the positioning pins. Whenever it is desired to remove the rim, as for machining purposes, bolts may be inserted through openings 50 to maintain unit A in assembled relation after the removal of bolts 16, thus keeping the rubber elements intact. It will thus be seen that removal of the rim is a comparatively simple operation.

When the wheel is to be used under conditions requiring an electrical connection between the hub and rim of the wheel, the connection may be made by a flexible bond 51 joined to the hub and the inner plate 14.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A wheel comprising a rim portion having an inwardly extending annular flange, a hub member having an outwardly extending annular flange, a plate member adjacent said rim flange and having spaced areas of contact therewith, a second plate member on the same side of said rim flange and spaced from said first plate, said plates being detachably secured to said rim flange, said hub flange extending between said plates, rubber means compressed between said hub flange and said plates acting in shear to oppose relative movement between said members, and openings in said plates, said hub flange and said rubber means, positioned radially inwardly of said rim flange and adapted to receive retaining means for holding said rubber means compressed during removal of said rim portion from said plates.

2. A wheel comprising a rim portion having an inwardly extending annular flange, a hub member having an outwardly extending annular flange, a pair of spaced plate members on one side of said rim flange and detachably secured thereto, one of said plate members having spaced areas of contact with said rim flange, said hub flange extending between said plate members, means extending between said plates to maintain the latter in spaced relation, rubber means compressed between said plates and said hub flange acting in shear to oppose relative movement between said members, and openings in said plate member, said hub flange and said rubber means, positioned radially inwardly of said rim flange and adapted to receive retaining means for holding said rubber means compressed during removal of said rim portion from said plate members.

3. A wheel comprising a rim portion having an inwardly extending annular flange, circumferentially spaced projections on one side of said flange, a hub member having an outwardly extending annular flange, housing means adjacent said rim flange and engaging said projections to space said means from said rim flange, portions of said housing means extending radially inwardly of said rim portion, means securing said housing means to said rim flange, said hub flange extending into said housing means, rubber means within said housing means acting in shear to support said hub member, and openings in said housing means, said hub flange and said rubber means, positioned radially inwardly of said rim flange and adapted to receive retaining means for holding said housing means, said rubber means and said hub flange in assembled relation during removal of said rim portion from said housing means.

4. A wheel comprising a rim portion having an inwardly extending annular flange, laterally extending projections on one side of said flange, a plate member adjacent said flange, means on said member extending laterally therefrom and engaging said projections, another plate member spaced from said first member, said members being detachably secured to said flange, a hub member having an annular flange extending between said members, rubber means between said members and said hub flange acting in shear to support said hub member, and openings in said plate members, said hub flange and said rubber means, positioned radially inwardly of said rim flange and adapted to receive retaining means for holding said plate members, said rubber means and said hub flange in assembled relation during removal of said rim portion from said plate members.

5. A wheel comprising a rim portion having an inwardly extending annular flange, a plate member adjacent said rim flange having spaced areas of contact therewith, a second plate member on the same side of said rim flange and spaced from said first plate, means detachably securing said plates to said rim flange, projecting means on said first named plate in engagement with said rim flange to assist said first named means in supporting said plate in a vertical direction, a hub member having an annular flange extending between said plates, rubber means between said hub flange and said plates acting in shear to support said hub member, and openings in said plate members, said hub flange and said rubber means, positioned radially inwardly of said rim flange and adapted to receive retaining means for holding said plate members, said rubber means and said hub flange in assembled relation during removal of said rim portion from said plate members.

TIM ZINTSMASTER.